United States Patent
Chen (10) Patent No.: US 9,740,183 B2
(45) Date of Patent: Aug. 22, 2017

(54) BUILDING ENERGY MANAGEMENT SYSTEM LEARNING

(71) Applicant: FUJITSU LIMITED, Kawasaki-shi, Kanagawa (JP)

(72) Inventor: Wei-Peng Chen, Fremont, CA (US)

(73) Assignee: FUJITSU LIMITED, Kawasaki (JP)

( * ) Notice: Subject to any disclaimer, the term of this patent is extended or adjusted under 35 U.S.C. 154(b) by 612 days.

(21) Appl. No.: 13/960,181

(22) Filed: Aug. 6, 2013

(65) Prior Publication Data

US 2015/0045966 A1    Feb. 12, 2015

(51) Int. Cl.
*G05B 13/02*    (2006.01)
*G05B 15/02*    (2006.01)
*G05B 13/04*    (2006.01)
*F24F 11/00*    (2006.01)

(52) U.S. Cl.
CPC ............ *G05B 15/02* (2013.01); *F24F 11/006* (2013.01); *G05B 13/042* (2013.01); *F24F 2011/0047* (2013.01); *F24F 2011/0075* (2013.01); *F24F 2011/0091* (2013.01); *G05B 2219/2642* (2013.01)

(58) Field of Classification Search
None
See application file for complete search history.

(56) References Cited

U.S. PATENT DOCUMENTS

| 2008/0294291 | A1* | 11/2008 | Salsbury | F24F 11/006 700/277 |
| 2013/0013124 | A1* | 1/2013 | Park | G06Q 50/06 700/296 |
| 2013/0226320 | A1* | 8/2013 | Berg-Sonne | G05B 15/02 700/90 |

OTHER PUBLICATIONS

"Best Practices in HVAC Digital Controls," Advanced Energy, Jun. 2012, pp. 1-31.
Victor M. Zavala, "Real-Time Optimization for Energy Management in Building Systems," Argonne National Laboratory, Mar. 30, 2011, 12 pages.
"Attune Advisory Services—Energy Optimization," Honeywell, Mar. 2012, 4 pages.
T. X. Nghiem, G. J. Pappas. Citations, "Receding-horizon supervisory control of green buildings," American Control Conference (ACC), Jun. 29, 2011, pp. 4416-4421.

* cited by examiner

*Primary Examiner* — Sean Shechtman
(74) *Attorney, Agent, or Firm* — Maschoff Brennan (57) ABSTRACT

A method of managing energy consumption of a building may include performing an optimization for a zone of a building. The method may also include determining an environmental condition setting for the zone based on the optimization. Further, the method may include receiving user feedback of the environmental condition setting. The user feedback may reflect an environmental condition preference of the user. The method may also include modifying the optimization based on the feedback of the environmental condition setting and updating the environmental condition setting based on the modified optimization.

16 Claims, 5 Drawing Sheets

BUILDING ENERGY MANAGEMENT SYSTEM LEARNING

FIELD

The embodiments discussed herein are related to building energy management system learning.

BACKGROUND

Improving energy efficiency of buildings may help reduce the costs associated with maintaining and using the buildings and may also help reduce the environmental impact of the buildings. Additionally, maintaining favorable conditions for occupants of buildings may improve productivity and overall well-being of the occupants.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method of managing energy consumption of a building may include performing an optimization for a zone of a building. The method may also include determining an environmental condition setting for the zone based on the optimization. Further, the method may include receiving user feedback of the environmental condition setting. The user feedback may reflect an environmental condition preference of the user. The method may also include modifying the optimization based on the feedback of the environmental condition setting and updating the environmental condition setting based on the modified optimization.

The object and advantages of the embodiments will be realized and achieved at least by the elements, features, and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Improving energy efficiency of buildings is a growing interest in today's world. Improving energy efficiency may include both reducing energy costs and environmental impact of buildings. To improve energy efficiency, the control of systems within buildings that consume energy are increasingly automated and optimized in a manner to reduce energy consumption of the buildings. However, in some instances the automation may not adequately address preferences or concerns of occupants of a building. For example, a building energy management system (BEMS) may be configured to determine a temperature setting for a building based on an optimization that may seek to reduce energy consumption of the building. However, the temperature setting may be too hot or too cold such that occupants of the building may be uncomfortable. Uncomfortable temperature settings may lead to irritability, lethargy, or any number of other factors that may reduce productivity of the occupants.

Conversely, occupants of a building may override the temperature setting determined by a BEMS, which may significantly reduce the energy efficiency of the building. Additionally, different occupants may prefer a wide range of temperatures such that occupants in one portion of the building may prefer warmer temperatures while occupants in another portion of the building may prefer cooler temperatures, which may also lead to inefficiencies in energy consumption.

Accordingly, as described in further detail below, a BEMS may be configured to determine energy consumption of a zone of a building. The BEMS may also be configured to perform an optimization for the zone based on the energy consumption to determine an environmental condition setting for the zone. The BEMS may also be configured to receive user feedback (e.g., from an occupant or building manager of the building) with respect to the environmental condition setting that may reflect an environmental condition preference of the user. The BEMS may accordingly modify the optimization based on the user feedback and may update the environmental condition setting based on the modified optimization. Accordingly, in some embodiments, the BEMS may consider both energy efficiency and user (e.g., occupant or building manager) preferences in performing optimization and determining the environmental condition setting. Additionally, in some embodiments, the user may be presented with a visualization that may indicate a relationship between various environmental condition settings and energy consumption such that the user may be more informed as to the impact on energy consumption and/or eco-friendliness of different environmental condition settings.

An "optimization" may refer to any scheme or routine that may be used to determine environmental condition settings in an attempt to improve energy efficiency and/or user satisfaction. As such, a routine or scheme that does not necessarily yield a best or ideal result may still be considered an "optimization" in the present disclosure. For example, in some embodiments, the optimization described herein may be a heuristic approach based on past energy consumption and/or user feedback that may yield an inferior result with respect to user satisfaction or reduced energy consumption as compared to other results in some instances.

Embodiments of the present disclosure will be explained with reference to the accompanying drawings.

Figure 1:
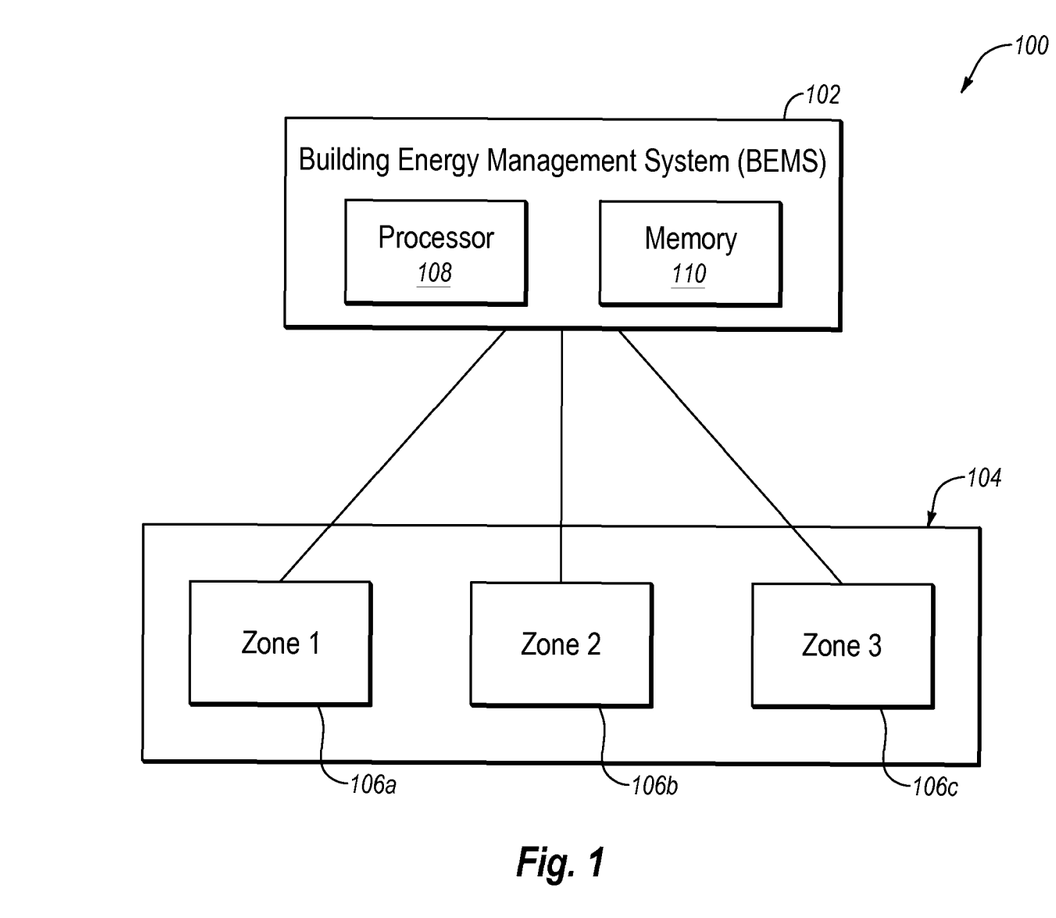
FIG. 1 illustrates an example system configured to manage energy consumption of a building.

FIG. 1 illustrates an example system 100 configured to manage energy consumption of a building, arranged in accordance with at least one embodiment described herein. The system 100 may include a BEMS 102 that may be configured to manage energy consumption of a building 104. In some embodiments, the building 104 may be divided into different zones 106. In the illustrated embodiment, the building 104 may be divided into a zone 106a, a zone 106b, and a zone 106c. However, the building 104 may be divided into any number of zones 106 depending on different implementations, including where the entire building 104 may be considered one zone 106.

The BEMS 102 may include a processor 108 and memory 110. The processor 108 may be any suitable a special purpose or general-purpose computer including various computer hardware or software modules, as discussed in greater detail below.

The memory 110 may include computer-readable media for carrying or having computer-executable instructions or data structures stored thereon. Such computer-readable media may be any available media that may be accessed by a general purpose or special purpose computer. By way of example, and not limitation, such computer-readable media may include tangible computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions may include, for example, instructions and data which cause the processor 108 to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The BEMS 102 may be configured to adjust one or more energy consuming systems that may be associated with one or more of the zones 106. For example, in some embodiments, each of the zones 106 may include a thermostat (not expressly illustrated in FIG. 1) that may control a heating, ventilation, and air conditioning (HVAC) system that may maintain a temperature of their respective zones 106 based on respective temperature settings of the thermostats. In these and other embodiments, the BEMS 102 may be configured to control the thermostats such that the BEMS 102 may adjust the temperature settings of one or more of the zones 106. Additionally, in some embodiments, the BEMS 102 may be configured to adjust other systems such as the lights of one or more of the zones 106.

As mentioned above, in some embodiments, the BEMS 102 may be configured to determine an environmental setting for one or more of the zones 106. The environmental setting may include, but is not limited to, a temperature setting of the zones 106, a state of window treatments (e.g., opened or closed blinds) within the zones 106, lights being turned on or off within the zones 106, etc.

In some embodiments, the BEMS 102 may be configured to determine environmental settings for the zones 106 by performing an optimization that may be based on a learning routine performed by the BEMS 102. In some embodiments, the learning routine may include the BEMS 102 applying different environmental settings (e.g., temperature settings) in each zone 106 and measuring the dynamics of environmental changes inside each zone 106 for the different environmental settings when different factors (discussed below) are present that may affect environmental conditions (e.g., temperature, lighting, etc.) of the zones 106.

In some embodiments, the different environmental settings may be temperature settings and the environmental changes may be temperature changes that may change according to the different conditions, which may dictate how often the HVAC system may turn on to maintain a particular temperature setting. For example, in some embodiments, initial temperature settings for the zones 106a, 106b, and 106c may be set at 75° Fahrenheit (F), 73° F., and 77° F., respectively. Additionally, a testing range for each of the zones 106a, 106b, and 106c may be ±1° F. In some embodiments, the temperatures of the zones 106a, 106b, and 106c may be adjusted one at a time in different scenarios as illustrated by Table 1 below:

TABLE 1

| Scenario Number | 1 | 2 | 3 | 4 | 5 | 6 | 7 |
|---|---|---|---|---|---|---|---|
| Zone 106a Temp. | 75° F. | 76° F. | 74° F. | 75° F. | 75° F. | 75° F. | 75° F. |
| Zone 106b Temp. | 73° F. | 73° F. | 73° F. | 74° F. | 72° F. | 73° F. | 73° F. |
| Zone 106c Temp. | 77° F. | 77° F. | 77° F. | 77° F. | 77° F. | 78° F. | 76° F. |

As illustrated in Table 1, in the first scenario, the temperatures of the zones 106a, 106b, and 106c may be set to the initial temperature settings of 75° F., 73° F., and 77° F., respectively. In the second scenario, the temperature setting for the zone 106a may be increased by a degree from its initial temperature setting of 75° F. to 76° F. while the temperature settings for the zones 106b and 106c may be set at their respective initial temperature settings of 73° F. and 77° F. In the third scenario, the temperature setting for the zone 106a may be decreased by a degree from its initial temperature setting of 75° F. to 74° F. while the temperature settings for the zones 106b and 106c may be set at their respective initial temperature settings of 73° F. and 77° F. In the fourth scenario, the temperature setting for the zone 106b may be increased by a degree from its initial temperature setting of 73° F. to 74° F. while the temperature settings for the zones 106a and 106c may be set at their respective initial temperature settings of 75° F. and 77° F.

In the fifth scenario, the temperature setting for the zone 106b may be decreased by a degree from its initial temperature setting of 73° F. to 72° F. while the temperature settings for the zones 106a and 106c may be set at their respective initial temperature settings of 75° F. and 77° F. In the sixth scenario, the temperature setting for the zone 106c may be increased by a degree from its initial temperature setting of 77° F. to 78° F. while the temperature settings for the zones 106a and 106b may be set at their respective initial temperature settings of 75° F. and 73° F. In the seventh scenario, the temperature setting for the zone 106c may be decreased by a degree from its initial temperature setting of 77° F. to 76° F. while the temperature settings for the zones 106a and 106b may be set at their respective initial temperature settings of 75° F. and 73° F.

In some embodiments, the BEMS 102 may measure the impact on environmental conditions of the other zones 106 based on the environmental setting of one of the other zones. Additionally, the BEMS 102 may measure the energy consumption associated with the different environmental settings for the different zones 106. For example, during the first, second, and third scenarios listed above in the Table 1, the BEMS 102 may measure how the different temperature settings for the zone 106a may affect the environmental conditions, e.g., temperatures, of the zones 106b and 106c, as well as the energy consumption of the building 104. The BEMS 102 may perform similar operations with respect to the other temperature settings for the zones 106b and 106c in the fourth through seventh scenarios.

Additionally, in some embodiments, the BEMS 102 may be configured to record other information that may be associated with the different environmental settings of the zones 106. For example, the BEMS 102 may be configured to record the number of complaints that may be received during a certain scenario associated with Table 1 above. In these or other embodiments, the BEMS 102 may be configured to determine when occupants of the zones 106 override or attempt to override the temperature settings during the different scenarios, which may indicate displeasure with the settings of the respective scenarios. Accordingly, the BEMS 102 may be configured to learn how different temperature settings of a particular zone 106 may affect temperature in other zones 106 as well as energy consumption of the building 104 and occupant satisfaction. Table 2 below indicates an example of energy consumption and associated complaints for the different scenarios described above with respect to Table 1.

TABLE 2

| Scenario Number | 1 | 2 | 3 | 4 | 5 | 6 | 7 |
|---|---|---|---|---|---|---|---|
| Zone 106a Temp. | 75° F. | 76° F. | 74° F. | 75° F. | 75° F. | 75° F. | 75° F. |
| Zone 106b Temp. | 73° F. | 73° F. | 73° F. | 74° F. | 72° F. | 73° F. | 73° F. |
| Zone 106c Temp. | 77° F. | 77° F. | 77° F. | 77° F. | 77° F. | 78° F. | 76° F. |
| Energy (kWh) | 15 | 14.5 | 16 | 14 | 16.5 | 13.5 | 15.6 |
| Complaints | 5 | 6 | 4 | 7 | 4 | 7 | 5 |

Factors that may affect environmental conditions (e.g., temperature) of the zones 106 may change. Therefore, in some embodiments, the BEMS 102 may perform a learning operation such as that described above with respect to Tables 1 and 2 multiple times when factors that may affect environmental conditions (e.g., temperature) of the zones 106 may be different. Some of the different factors that may affect the temperature of the zones 106 that may change may include use of a zone 106 such as a zone 106 being used as a kitchen or a lobby, a server room etc., different times of day, outdoor temperature, outdoor weather conditions such as wind and cloud cover, different times of year, different occupancy numbers of the building 104 and the zones 106, days of the week (which may affect occupancy), holidays (which may also affect occupancy), whether or not window treatments such as blinds or curtains are open or closed, whether or not lights are on or off, equipment within a zone 106 such as ovens, electronics, refrigeration equipment etc., and the temperatures of other zones 106.

As another example, in these or other embodiments, the learning routine may include the BEMS 102 determining whether or not the lights in the zones 106 may be turned on or off based on various conditions such as the time of day, the time of year, the amount of natural light that enters a zone 106, occupancy of the building 104 and/or one or more of the zones 106, frequency of use of one or more of the zones 106, an activity (e.g., meeting) being performed in one or more of the zones 106, etc. Accordingly, the BEMS 102 may be configured to learn how environmental conditions such as temperature and/or lighting conditions of the building 104 and zones 106 may change based on a variety of factors.

In some embodiments, the BEMS 102 may be configured to learn how the different environmental conditions of the building 104 and the zones 106 may be affected by a demand response as well as how energy consumption and occupant satisfaction may be related to the demand response. A demand response may occur when a utility company that may provide power to the building 104 may seek to reduce the overall energy demand within an area that may be serviced by the utility company that includes the building 104. A demand response request may often occur during the day when energy demands may be higher.

In some embodiments, the BEMS 102 may be configured to track and determine which settings for the zones 106 may satisfy desired energy consumption reduction of a demand response. The BEMS 102 may also be configured to track and determine energy consumption to bring the environmental conditions of the building 104 and its associated zones 106 back to their pre-demand response levels once the demand response has ended. Additionally, the BEMS 102 may determine productivity that may be affected by the demand response based on factors such as the number of complaints that may be received with respect to the environmental settings associated with complying with the demand response.

Therefore, the BEMS 102 may be configured to perform learning operations to determine correlations between energy usage, environmental settings of the zones 106, environmental conditions of the zones 106, and factors that may affect the environmental conditions of the zones 106. In some embodiments, the BEMS 102 may be configured to use one or more models generated based on the learning process that may be used to predict future energy consumption of the building 104 and/or occupant satisfaction or productivity.

For example, based on Table 2 above, a mathematical model of energy consumption of the building may be derived based on the temperature set points and associated energy consumption of Table 2. The BEMS 102 may accordingly determine and extrapolate energy consumption of the building 104 at the temperature set points of Table 2, and in some embodiments, other temperature set points outside of those of Table 2, from the mathematical energy consumption model. In these or other embodiments, the energy consumption model may also be based on factors that may affect the environmental conditions of the zones or any other relevant factor.

As another example, based on Table 2, a mathematical model of user satisfaction and productivity may be derived based on the temperature set points and associated complaints indicated in Table 2. The BEMS 102 may accordingly, determine and extrapolate user satisfaction and productivity for the temperature set points of Table 2, and in some embodiments, other temperature set points, from the mathematical user satisfaction and productivity model. In these or other embodiments, the user satisfaction and productivity model may also be based on satisfaction and productivity metrics other than complaints such as occupant overrides of the temperature set points.

In some embodiments, based on the learning and/or models described above, the BEMS 102 may be configured to perform the optimization to determine which environmental settings for the zones 106 may yield acceptable environmental conditions for the zones 106 and acceptable energy usage when certain factors that may influence the environmental conditions are present. The BEMS 102 may be configured to perform the optimization using any suitable optimization protocol and in some embodiments may use a predictive control model of the building 104 to perform the optimization.

In some embodiments, the BEMS 102 may be configured to perform the optimization based on energy consumption associated with the building 104 such that a scenario that has less energy consumption may be used. For example, with respect to the example scenarios given above with respect to Tables 1 and 2, when the primary goal of the optimization is reduced energy consumption, the temperature settings associated with the sixth scenario may be selected because they may use the least amount of energy. In these or other embodiments, the BEMS 102 may perform the optimization based on productivity factors. For example, as mentioned above, an increased number of complaints or temperature overrides from the occupants of the building 104 may indicate that the occupants are uncomfortable and thus may be less productive. Therefore, with respect to the example scenarios given above with respect to Tables 1 and 2, when the primary goal is improved productivity, the temperature settings associated with the third scenario may be selected because the fewest number of complaints may be received under these conditions.

In some embodiments, the optimization may be based on both productivity and energy consumption factors. For example, with respect to the example scenarios given above with respect to Tables 1 and 2, the temperature settings associated with the first scenario or the second scenario may be selected because a relatively low number of complaints may be received at these temperature settings and the energy consumption may be relatively low compared to some of the other temperature settings. Additionally, in some embodiments, the BEMS 102 may take into consideration how participating in a demand response may affect temperature settings, energy consumption, complaints, overrides and the associated optimization to determine whether participating in the demand response is consistent with the settings and goals of the optimization. In performing the optimization while considering a demand response, the BEMS 102 may determine the reduced amount of energy consumption that may be required by the demand response and which environmental settings may be used to achieve the reduced energy consumption. In these or other embodiments, the optimization may use derived occupant satisfaction and/or building energy consumption models instead of or in addition to actual past values.

In some embodiments, the BEMS 102 may be configured to provide information to the occupants (and/or facility managers) of the building 104 and/or the zones 106 with respect to energy consumption by the building 104 and the zones 106 based on the learning and optimization results. In some embodiments, the zones 106 may include a thermostat that may provide a visual representation of the impact of various temperature settings on energy consumption and environmental impact.

For example, in some embodiments, a visual interface of a thermostat associated with a zone 106 may include colors or some other sort of indication along the various temperature set points for the zone 106 that may indicate varying levels of reduced environmental impact such as reduced energy consumption and/or emissions that may be referred to generally as "eco-friendliness." For instance, settings within a green region of a display of the thermostat may indicate settings that consumes less energy and are more eco-friendly than settings within a yellow region of the zone of the thermostat, and settings within the yellow region may indicate settings that may consume less energy and be more eco-friendly than settings that may be within a red region of the display of the thermostat. Additionally, the visual interface may indicate in which region the current temperature setting is located such that it may be easily determined how eco-friendly the current setting is. In some embodiments, the determinations of which settings are more eco-friendly than others may be based on the learning and optimization previously performed.

For instance, a region with temperature settings that result in up to 10% more energy usage than an optimal setting based on lowest energy consumption may be set as an eco-friendly region (e.g., the green zone). A region with temperature settings that result in 10% to 50% more energy usage than the optimal setting based on lowest energy consumption may be set as a less eco-friendly region (e.g. the yellow region), and a region with temperature settings that result in more than 50% energy usage than the optimal setting based on lowest energy consumption may be set as an eco-unfriendly region (e.g., the red region).

Figure 2:
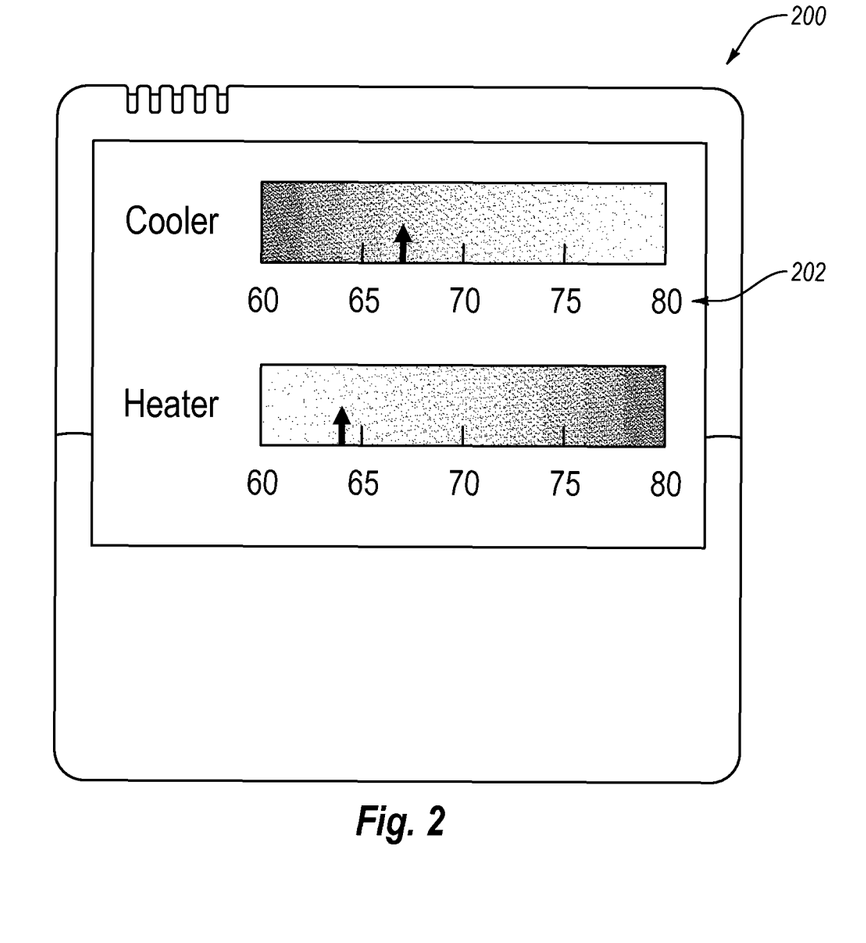
FIG. 2 illustrates an example of a visual interface of a thermostat that may indicate varying levels of eco-friendliness.

FIG. 2 illustrates an example of a visual interface 202 of a thermostat 200 that may indicate varying levels of eco-friendliness, according to at least one embodiment described herein. In the illustrated embodiment, the darker shading may indicate less eco-friendly temperature settings and the lighter shading may conversely indicate more eco-friendly temperature settings.

Returning to FIG. 1, as mentioned above, different temperature settings may also have varying levels of energy consumption and eco-friendliness based on different factors that may affect environmental conditions of the zones 106. Additionally, different factors may affect different zones 106 in different ways such that the energy consumption to maintain certain environmental conditions in certain zones 106 may differ. Accordingly, the locations of certain eco-friendly zones on thermostats associated with the different zones 106 may vary according to zones 106 and various factors that may affect the environmental conditions of the zones.

For example, a particular zone 106 may be proximate to a server room that may generate a substantial amount of heat, which may heat the particular zone 106. Accordingly, the HVAC system that may service the particular zone 106 may be able to maintain a warmer temperature within the particular zone 106 during the winter without consuming as much energy as that used to maintain the same temperature within another zone 106 that may be far away from the server room. However, maintaining a particular temperature in the particular zone 106 that is proximate to the server room during the summer may consume more energy than maintaining the same temperature within the other zone 106 that may be far away from the server room. Therefore, the temperatures that are within the different regions indicating eco-friendliness of a thermostat for the particular zone 106 that may be proximate to the server room may differ from the temperatures that are within the different regions indicating eco-friendliness of a thermostat for the other zone 106 that may be far away from the server room.

In some embodiments, a visual interface may include multiple zones 106 that may indicate the different eco-friendliness settings for more than one of the zones 106 such that a more complete picture of energy consumption of the building 104 may be observed. Accordingly, in some embodiments, a facility manager may allocate resources and use of the zones 106 based on the different settings for the zones 106 based on the visual interface that includes the multiple zones 106.

Figure 3:
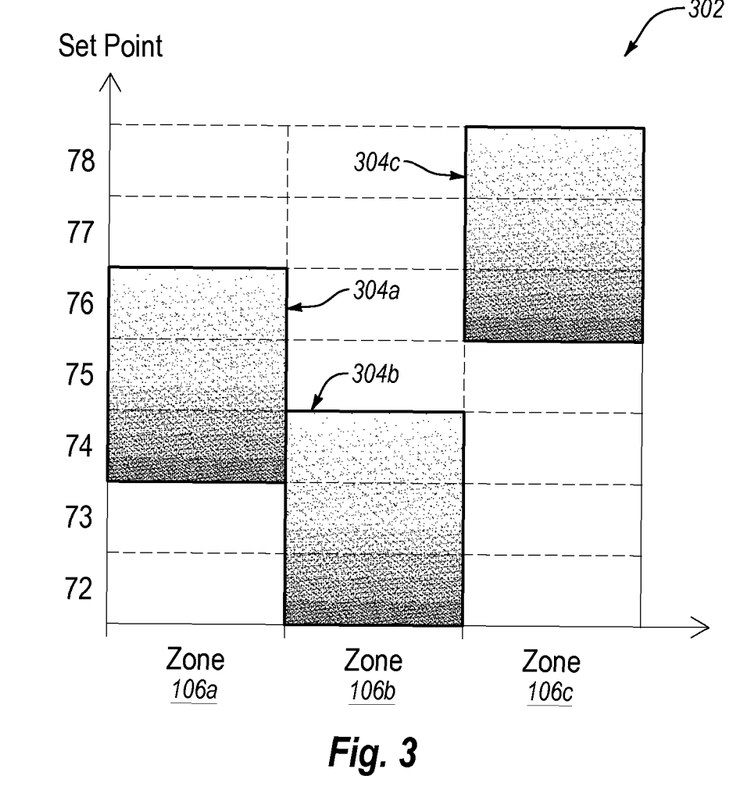
FIG. 3 illustrates an example of a visual interface that may indicate varying levels of eco-friendliness associated with cooling zones of the building of FIG. 1.

FIG. 3 illustrates an example of a visual interface 302 that may indicate varying levels of eco-friendliness associated with cooling the zones 106a, 106b, and 106c of FIG. 1, according to at least one embodiment described herein. In the illustrated embodiment, each zone 106 may have a range 304 of temperature settings at which the respective zone 106 may be set. For example, in the illustrated embodiment, the zone 106a may have a range 304a of temperature settings that may be between 74° F. and 76° F., the zone 106b may have a range 304b that may be between 72° F. and 74° F., and the zone 106c may have a range 304c that may be between 76° F. and 78° F. In other embodiments, the ranges 304 may be different and may include any range of temperatures. In some embodiments, the ranges 304 may be determined by the BEMS 102 while performing the optimization. In the illustrated embodiment, the darker shading in each range 304 may indicate less eco-friendly temperature settings for cooling the respective zones 106 and the lighter shading in each range 304 may conversely indicate more eco-friendly temperature settings.

Returning to FIG. 1, in some embodiments, the visual interface may also indicate how the energy consumption and eco-friendliness of particular environmental settings may change for the particular zone 106 based on changes in factors that may affect the environmental conditions of the particular zone 106. For example, varying outside temperatures may affect the amount of energy that may be consumed to maintain the particular zone 106 at a particular temperature setting such that the eco-friendliness of the particular temperature setting may vary based on the outside temperature. Therefore, in some embodiments, the visual interface of the thermostat associated with the particular zone 106 may indicate varying degrees of eco-friendliness of different temperature settings when the outside temperature is at different levels.

Figure 4:
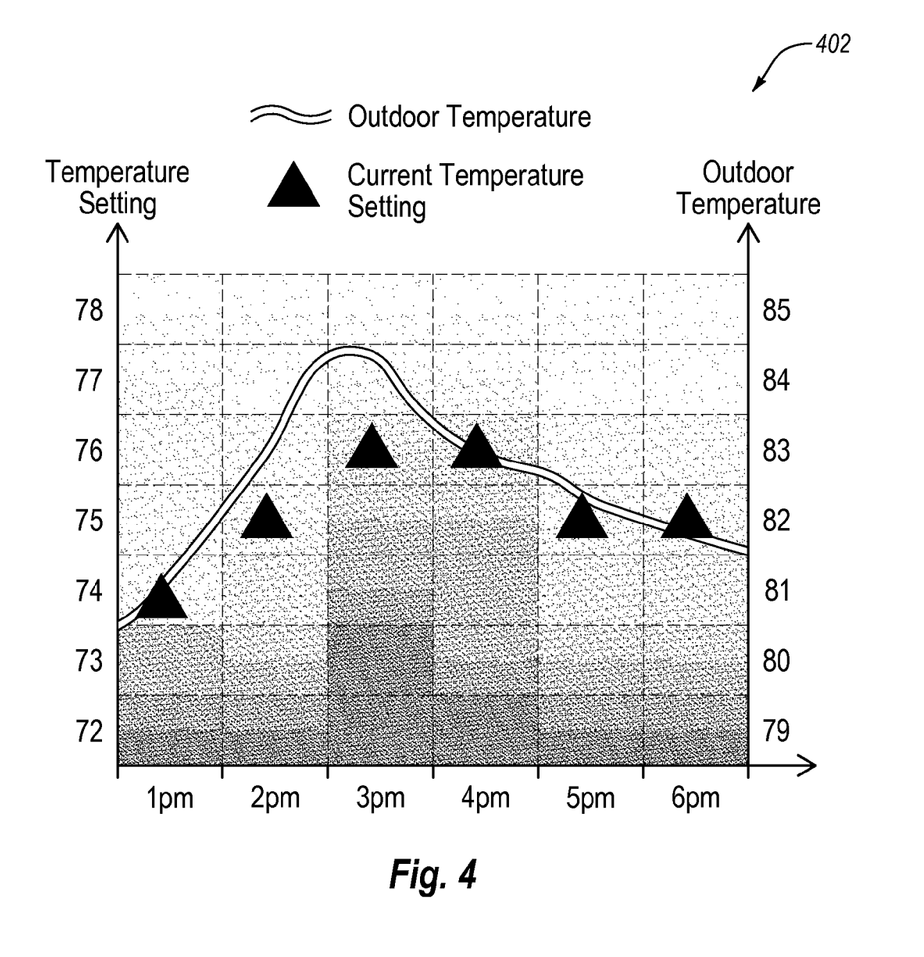
FIG. 4 illustrates an example of a visual interface of a thermostat that may indicate varying levels of eco-friendliness associated with cooling a zone of a building based on outside temperatures.

FIG. 4 illustrates an example of a visual interface 402 that may indicate varying levels of eco-friendliness associated with cooling a zone based on outside temperatures, according to at least one embodiment described herein. In the illustrated embodiment, the y-axis on the left indicates a temperature setting for the zone, the y-axis on the right indicates the outdoor temperature, and the x-axis indicates different times of the day. The discrete triangles indicate the temperature settings for the zone at different times of day and the continuous curve indicates the outdoor temperature at different times of day. Additionally, in the illustrated embodiment, the darker shading may indicate less eco-friendly temperature settings and the lighter shading may conversely indicate more eco-friendly temperature settings.

As illustrated in FIG. 4, the eco-friendliness of a particular temperature setting may vary depending on the outside temperature. Accordingly, based on the visual interface 402, a user may be more fully aware of the impact of different temperature settings on energy consumption and eco-friendliness depending on the outside temperature. For example, the user may set the temperature setting for the zone for the day according to the discrete triangles such that the temperature settings are at more eco-friendly settings throughout the day than if the temperature setting were maintained throughout the entire day. In some embodiments, the user may user may use the visual interface 402 to set the temperature settings based on the actual outdoor temperature or based on the predicted outdoor temperature.

Returning to FIG. 1, in some embodiments the visual interface may not be limited to indicating only to energy consumption or eco-friendliness associated with a particular environmental setting for one or more of the zones 106. For example, in some embodiments, the visual interface may indicate a number of complaints and/or manual overrides that may be associated with a particular environmental setting for one or more of the zones 106. Therefore, the placement of different environmental settings in different regions (e.g., green, yellow, red, shaded to not shaded, etc.) within the visual interface may also take into consideration factors that may affect productivity. Further, in some embodiments, the different regions may indicate energy consumption or eco-friendliness, but a number of complaints and/or manual overrides may also be displayed with respect to the different environmental settings.

In some embodiments, the BEMS 102 may also be configured to continue receiving feedback and modifying the optimization based on the continued feedback. Accordingly, the BEMS 102 may continue to improve the optimization for the building 104 after the initial learning phase. In some embodiments, the BEMS 102 may continue to track complaints and/or manual overrides associated with particular environmental settings and may modify the optimization accordingly. For example, the BEMs 102 may determine that a certain temperature setting for a zone 106 may be unacceptable if a certain number of complaints and/or overrides associated with that setting are received. Accordingly, the BEMS 102 may modify the optimization such that a temperature setting with the certain number, or greater than the certain number, of complaints and/or overrides may be a hard constraint in the optimization. Therefore, the BEMS 102 may adjust the optimization based on the feedback. In some embodiments, the BEMS 102 may also be configured to modify the energy consumption and/or occupant satisfaction and productivity models based on the feedback to improve the optimization.

As such, the BEMS 102 may be configured to determine and set environmental settings for the building 104 to improve occupant satisfaction with the environmental settings while also considering energy consumption and/or environmental impact associated with the different environmental settings. Modifications may be made to the system 100 without departing from the scope of the present disclosure. For example, the number of zones 106 associated with the building 104 may vary depending on the building 104. Additionally, although the BEMS 102 is illustrated as being outside of the building 104, in some embodiments the BEMS 102 may be inside the building 104. Further, the concepts described are not limited to individual buildings, but may be applied to a campus with multiple buildings where each of the buildings may be considered a zone and where each building may also include one or more zones.

Additionally, the visual representations given in FIGS. 2-4 are merely examples and any other suitable visual representation may be used to indicate energy consumption, eco-friendliness, productivity, or any other applicable factor that may be affected by an environmental setting such as a temperature setting.

Figure 5:
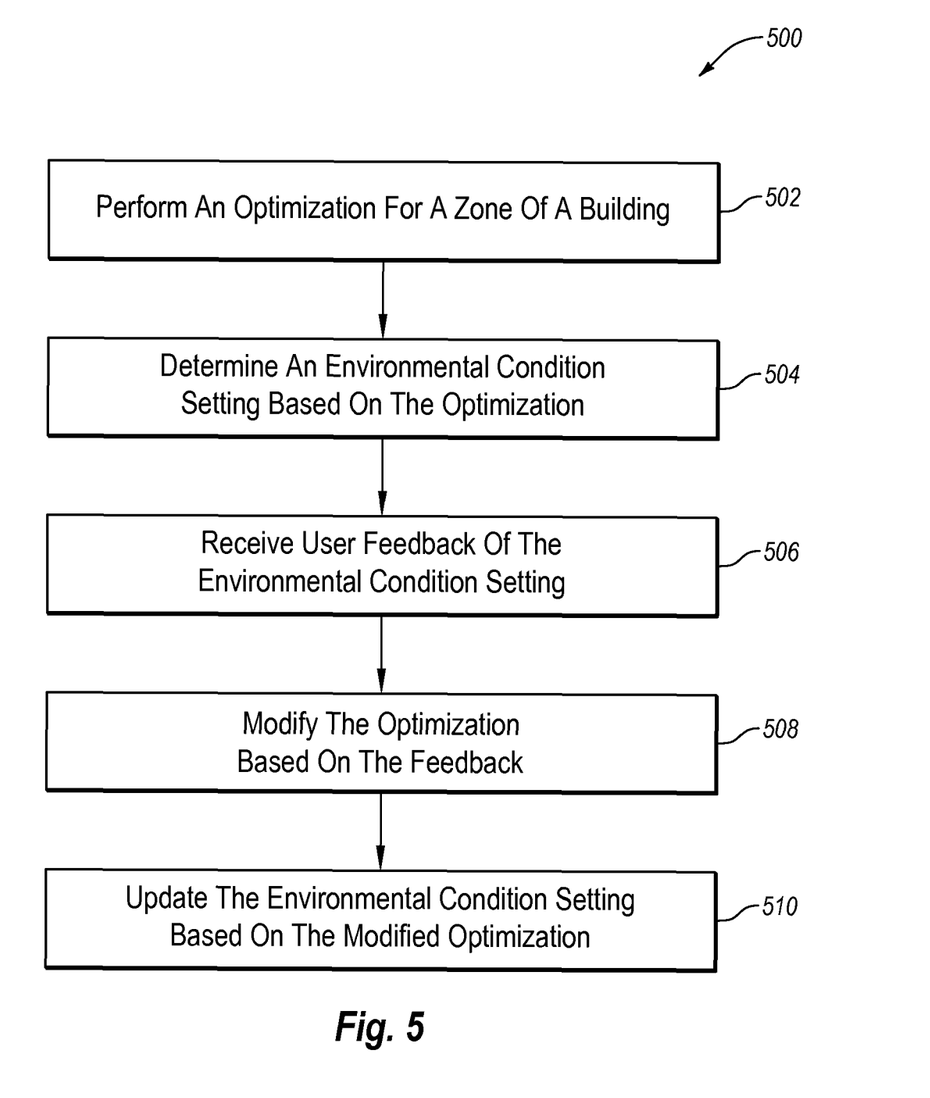
FIG. 5 illustrates a flowchart of an example method of managing energy consumption of a building.

FIG. 5 is a flowchart of an example method 500 of managing energy consumption of a building, arranged in accordance with at least one embodiment described herein. One or more steps of the method 500 may be implemented, in some embodiments, by a BEMS, such as the BEMS 102 described with respect to FIG. 1. Although illustrated as discrete blocks, various blocks may be divided into additional blocks, combined into fewer blocks, or eliminated, depending on the desired implementation.

The method 500 may begin at block 502, where an optimization may be performed for a zone of building. In some embodiments, the optimization may be based on one or more of occupant productivity, occupant comfort levels, occupant complaints, reduced energy consumption, occupancy, time of year, time of day, outside weather conditions, day of week, and date. Additionally, in some embodiments, the optimization may include determining an interaction between a first environmental condition of the zone and a second environmental condition of another zone and performing the optimization based on the determined interaction.

At block 504, an environmental condition setting for the zone may be determined based on the optimization. In some embodiments, the environmental condition setting may be a temperature setting and/or a lighting setting.

At block 506, user feedback of the environmental condition setting may be received. In some embodiments, the user feedback may reflect an environmental condition preference of the user. For example, in some embodiments, the user feedback may include an override of the environmental condition setting. In these and other embodiments, the user feedback may include complaints from occupants of the building and/or zone that are associated with the environmental condition settings.

At block 508, the optimization may be modified based on the feedback of the environmental condition setting. At block 510, the environmental condition setting may be updated based on the modified optimization.

Accordingly, the method 500 may be performed to manage energy consumption of a building. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For example, in some embodiments, the method 500 may further include determining an environmental change within the zone in response to a change in a factor that affects an environmental condition of the zone. The method 500 may also include determining energy consumption that corresponds to the environmental change and the change in the factor. In these and other embodiments, the method 500 may include performing the optimization based on the environmental change within the zone, the change in the factor, and the determined energy consumption that corresponds to the environmental change, and the change in the factor, among other things. Further, in some embodiments, the method 500 may include steps associated with generating energy consumption and/or occupant satisfaction and productivity models as described above.

As indicated above, the embodiments described herein may include the use of a special purpose or general-purpose computer (e.g., the processor 108 of FIG. 1) including various computer hardware or software modules, as discussed in greater detail below.

Further, as indicated above, embodiments described herein may be implemented using computer-readable media (e.g., the memory 110 of FIG. 1) for carrying or having computer-executable instructions or data structures stored thereon. Such computer-readable media may be any available media that may be accessed by a general purpose or special purpose computer. By way of example, and not limitation, such computer-readable media may include tangible computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions may include, for example, instructions and data which cause a general purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A method of managing energy consumption of a building comprising:

implementing, over a first time period, a first plurality of environmental condition settings for a plurality of zones of a building;

obtaining, over the first time period, a first plurality of factors that affect environmental conditions of the plurality of zones, wherein the first plurality of factors include outside temperature, time of day, occupancy of the building, occupancy of the plurality of zones, temperatures of the plurality of zones, interactions between temperatures of the plurality of zones, outside weather conditions, and equipment within the plurality of zones;

receiving, over the first time period, first user feedback with respect to the first plurality of environmental condition settings, the first user feedback reflecting a first environmental condition preference of one or more users over the first time period;

tracking, over the first time period, first energy consumption with respect to the first plurality of environmental condition settings and the first plurality of factors;

implementing, over a second time period, the first plurality of environmental condition settings for the plurality of zones of the building;

obtaining, over the second time period, a second plurality of factors that affect environmental conditions of the plurality of zones, wherein the second plurality of factors include outside temperature, time of day, occupancy of the building, occupancy of the plurality of zones, temperatures of the plurality of zones, interactions between temperatures of the plurality of zones, outside weather conditions, and equipment within the plurality of zones;

receiving, over the second time period, second user feedback with respect to the first plurality of environmental condition settings, the second user feedback reflecting a second environmental condition preference of the one or more users over the second time period;

tracking, over the second time period, second energy consumption with respect to the first plurality of environmental condition settings and the second plurality of factors;

implementing, over a third time period, a second plurality of environmental condition settings for the plurality of zones of the building, wherein the second plurality of environmental condition settings includes one or more environmental condition settings that are different from the first plurality of environmental condition settings;

obtaining, over the third time period, a third plurality of factors that affect environmental conditions of the plurality of zones, wherein the third plurality of factors include outside temperature, time of day, occupancy of the building, occupancy of the plurality of zones, temperatures of the plurality of zones, interactions between temperatures of the plurality of zones, outside weather conditions, and equipment within the plurality of zones;

receiving, over the third time period, third user feedback with respect to the second plurality of environmental condition settings, the third user feedback reflecting a third environmental condition preference of the one or more users over the third time period;

tracking, over the third time period, third energy consumption with respect to the second plurality of environmental condition settings and the third plurality of factors;

implementing, over a fourth time period, the second plurality of environmental condition settings for the plurality of zones of the building;

obtaining, over the fourth time period, a fourth plurality of factors that affect environmental conditions of the plurality of zones, wherein the fourth plurality of factors include outside temperature, time of day, occupancy of the building, occupancy of the plurality of zones, temperatures of the plurality of zones, interactions between temperatures of the plurality of zones, outside weather conditions, and equipment within the plurality of zones;

receiving, over the fourth time period, fourth user feedback with respect to the second plurality of environmental condition settings, the fourth user feedback reflecting a fourth environmental condition preference of the one or more users over the fourth time period;

tracking, over the fourth time period, fourth energy consumption with respect to the second plurality of environmental condition settings and the fourth plurality of factors;

generating an energy consumption model of energy consumption of the building based on the first plurality of environmental condition settings, the first plurality of factors, the first energy consumption, the second plurality of factors, the second energy consumption, the second plurality of environmental condition settings, the third plurality of factors, the third energy consumption, the fourth plurality of factors, and the fourth energy consumption;

generating a user satisfaction model based on the first user feedback, the second user feedback, the third user feedback, and the fourth user feedback;

performing an optimization for a zone of the plurality of zones based on the energy consumption model and the user satisfaction model; and determining an environmental condition setting for the zone based on the optimization.

2. The method of claim 1, wherein the first user feedback, the second user feedback, the third user feedback, and the fourth user feedback are based on one or more of the following: an override of the environmental condition setting by the one or more users; and complaints from occupants of the building.

3. The method of claim 1, further comprising generating a visualization of a relationship between the environmental condition setting and energy consumption.

4. The method of claim 1, wherein the first plurality of environmental condition settings and the second plurality of environmental condition settings include a temperature setting.

5. The method of claim 1, wherein the optimization is based on one or more of the following: occupant productivity, occupant comfort levels, occupant complaints, reduced energy consumption, occupancy, time of year, time of day, outside weather conditions, day of week, and date.

6. A system comprising:
memory configured to store computer-executable instructions; and
one or more processors communicatively coupled to the memory and configured to, in response to executing the computer-executable instructions, cause the system to perform operations, the operations comprising:
implementing, over a first time period, a first plurality of environmental condition settings for a plurality of zones of a building;
obtaining, over the first time period, a first plurality of factors that affect environmental conditions of the plurality of zones;
receiving, over the first time period, first user feedback with respect to the first plurality of environmental condition settings, the first user feedback reflecting a first environmental condition preference of one or more users over the first time period;
tracking, over the first time period, first energy consumption with respect to the first plurality of environmental condition settings and the first plurality of factors;
implementing, over a second time period, the first plurality of environmental condition settings for the plurality of zones of the building;

obtaining, over the second time period, a second plurality of factors that affect environmental conditions of the plurality of zones;

receiving, over the second time period, second user feedback with respect to the first plurality of environmental condition settings, the second user feedback reflecting a second environmental condition preference of the one or more users over the second time period;

tracking, over the second time period, second energy consumption with respect to the first plurality of environmental condition settings and the second plurality of factors;

implementing, over a third time period, a second plurality of environmental condition settings for the plurality of zones of the building, wherein the second plurality of environmental condition settings includes one or more environmental condition settings that are different from the first plurality of environmental condition settings;

obtaining, over the third time period, a third plurality of factors that affect environmental conditions of the plurality of zones;

receiving, over the third time period, third user feedback with respect to the second plurality of environmental condition settings, the third user feedback reflecting a third environmental condition preference of the one or more users over the third time period;

tracking, over the third time period, third energy consumption with respect to the second plurality of environmental condition settings and the third plurality of factors;

implementing, over a fourth time period, the second plurality of environmental condition settings for the plurality of zones of the building;

obtaining, over the fourth time period, a fourth plurality of factors that affect environmental conditions of the plurality of zones;

receiving, over the fourth time period, fourth user feedback with respect to the second plurality of environmental condition settings, the fourth user feedback reflecting a fourth environmental condition preference of the one or more users over the fourth time period;

tracking, over the fourth time period, fourth energy consumption with respect to the second plurality of environmental condition settings and the fourth plurality of factors;

generating an energy consumption model of energy consumption of the building based on the first plurality of environmental condition settings, the first plurality of factors, the first energy consumption, the second plurality of factors, the second energy consumption, the second plurality of environmental condition settings, the third plurality of factors, the third energy consumption, the fourth plurality of factors, and the fourth energy consumption;

generating a user satisfaction model based on the first user feedback, the second user feedback, the third user feedback, and the fourth user feedback;

performing an optimization for a zone of the plurality of zones based on the energy consumption model and the user satisfaction model; and determining an environmental condition setting for the zone based on the optimization.

7. The system of claim 6, wherein the first user feedback, the second user feedback, the third user feedback, and the fourth user feedback are based on one or more of the following: an override of the environmental condition setting by the one or more users; and complaints from occupants of the building.

8. The system of claim 6, wherein the operations further comprise generating a visualization of a relationship between the environmental condition setting and energy consumption.

9. The system of claim 6, wherein the first plurality of environmental condition settings and the second plurality of environmental condition settings include a temperature setting.

10. The system of claim 6, wherein the first plurality of factors, the second plurality of factors, the third plurality of factors, and the fourth plurality of factors include one or more of the following: outside temperature, time of day, occupancy of the building, occupancy of the plurality of zones, temperatures of the plurality of zones, interactions between temperatures of the plurality of zones, outside weather conditions, and equipment within the plurality of zones.

11. The system of claim 6, wherein the optimization is based on one or more of the following: occupant productivity, occupant comfort levels, occupant complaints, reduced energy consumption, occupancy, time of year, time of day, outside weather conditions, day of week, and date.

12. A system comprising:

a visual interface comprising:
　a temperature setting scale configured to indicate a range of potential temperature settings of a zone of a building;
　an energy consumption scale configured to indicate a relationship between energy consumption and the potential temperature settings of the zone, the energy consumption scale being based on an energy consumption model of the building;

memory configured to store computer-executable instructions; and one or more processors communicatively coupled to the memory and configured to, in response to executing the computer-executable instructions, cause the system to perform operations to generate the energy consumption model of the building, the operations comprising:

implementing, over a first time period, a first plurality of environmental condition settings for a plurality of zones of a building;

obtaining, over the first time period, a first plurality of factors that affect environmental conditions of the plurality of zones;

receiving, over the first time period, first user feedback with respect to the first plurality of environmental condition settings, the first user feedback reflecting a first environmental condition preference of one or more users over the first time period;

tracking, over the first time period, first energy consumption with respect to the first plurality of environmental condition settings and the first plurality of factors;

implementing, over a second time period, the first plurality of environmental condition settings for the plurality of zones of the building;

obtaining, over the second time period, a second plurality of factors that affect environmental conditions of the plurality of zones;

receiving, over the second time period, second user feedback with respect to the first plurality of environmental condition settings, the second user feedback reflecting a second environmental condition preference of the one or more users over the second time period;

tracking, over the second time period, second energy consumption with respect to the first plurality of environmental condition settings and the second plurality of factors;

implementing, over a third time period, a second plurality of environmental condition settings for the plurality of zones of the building, wherein the second plurality of environmental condition settings includes one or more environmental condition settings that are different from the first plurality of environmental condition settings;

obtaining, over the third time period, a third plurality of factors that affect environmental conditions of the plurality of zones;

receiving, over the third time period, third user feedback with respect to the second plurality of environmental condition settings, the third user feedback reflecting a third environmental condition preference of the one or more users over the third time period;

tracking, over the third time period, third energy consumption with respect to the second plurality of environmental condition settings and the third plurality of factors;

implementing, over a fourth time period, the second plurality of environmental condition settings for the plurality of zones of the building;

obtaining, over the fourth time period, a fourth plurality of factors that affect environmental conditions of the plurality of zones;

receiving, over the fourth time period, fourth user feedback with respect to the second plurality of environmental condition settings, the fourth user feedback reflecting a fourth environmental condition preference of the one or more users over the fourth time period; and tracking, over the fourth time period, fourth energy consumption with respect to the second plurality of environmental condition settings and the fourth plurality of factors.

13. The system of claim 12, wherein the energy consumption scale is based on eco-friendliness.

14. The system of claim 12, wherein the visual interface further comprises a plurality of temperature setting scales, energy consumption scales, and temperature setting indicators, each associated with one of the plurality of zones of the building.

15. The system of claim 12, wherein the visual interface further comprises an outdoor temperature scale configured to indicate a range of outdoor temperatures, wherein the energy consumption scale is further configured to indicate a relationship, as determined from the energy consumption model, between energy consumption, the potential temperature settings, and the range of outdoor temperatures.

16. The system of claim 12, wherein the visual interface further comprises a temperature setting indicator configured to indicate a current temperature setting for the zone on the temperature setting scale and the energy consumption scale to indicate, as determined from the energy consumption model, energy consumption at the current temperature setting.

* * * * *